Figure 1:
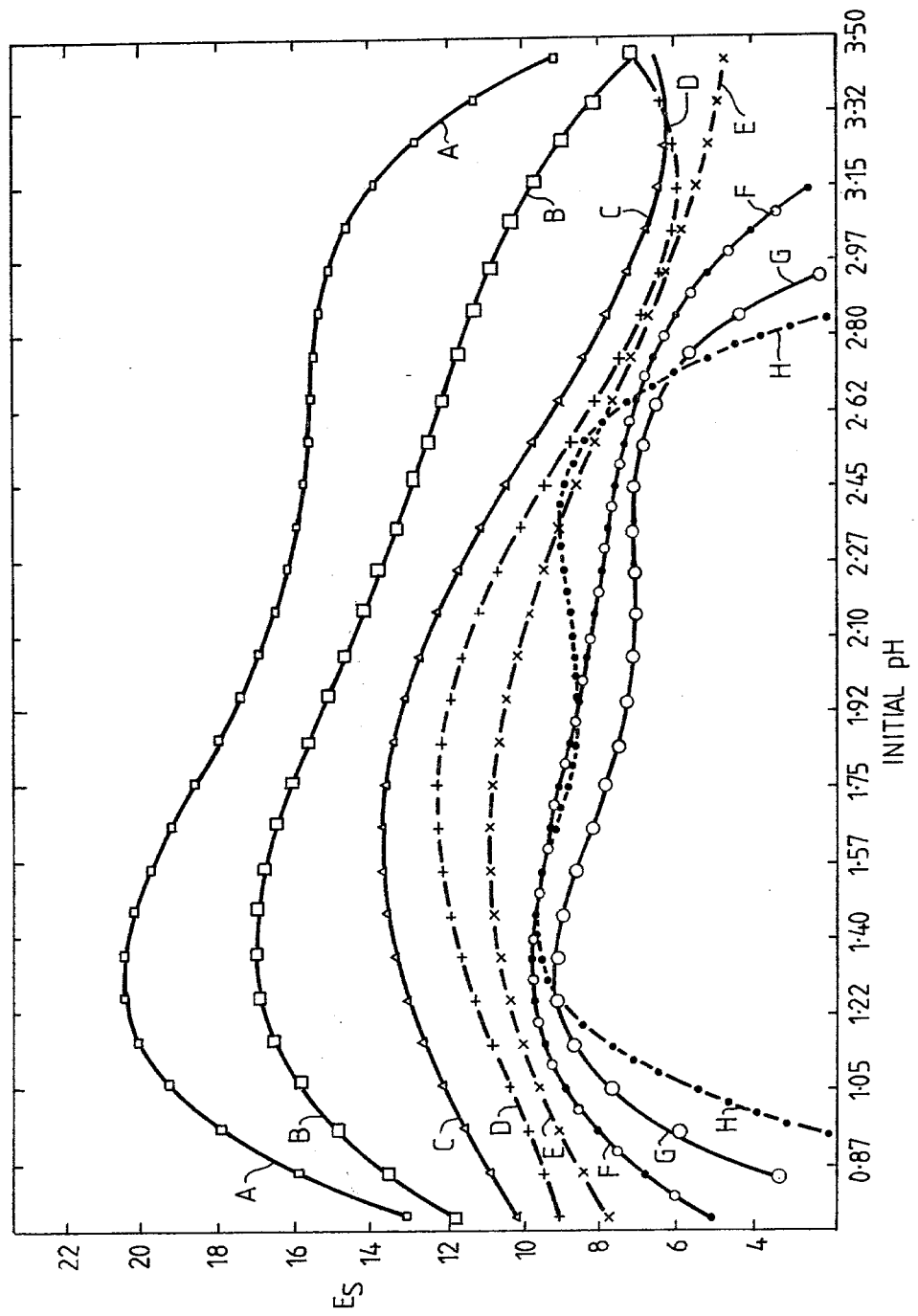

United States Patent [19]

Özensoy et al.

[11] 4,275,039

[45] Jun. 23, 1981

[54] SEPARATION OF TUNGSTEN AND MOLYBDENUM BY SOLVENT EXTRACTION

[75] Inventors: Erol Özensoy, London; Alfred R. Burkin, Brentwood, both of England

[73] Assignee: Interox Chemicals Limited, London, England

[21] Appl. No.: 120,294

[22] Filed: Feb. 11, 1980

[30] Foreign Application Priority Data

Jan. 17, 1980 [GB] United Kingdom ............. 01663/80

[51] Int. Cl.³ ............................ C01G 39/00; C01G 41/00
[52] U.S. Cl. ................................ 423/54; 75/101 BE; 423/DIG. 14
[58] Field of Search ............... 423/54, DIG. 14, 658.5; 75/101 BE

[56] References Cited

U.S. PATENT DOCUMENTS

| | | | |
|---|---|---|---|
| 3,576,595 | 4/1971 | Chiola et al. | 423/54 |
| 3,607,007 | 4/1971 | Chiola et al. | 423/54 |
| 3,607,008 | 4/1971 | Chiola et al. | 423/54 |
| 3,751,555 | 8/1973 | Peterson | 423/54 |
| 3,969,478 | 7/1976 | Zelikman et al. | 423/54 |

FOREIGN PATENT DOCUMENTS

| | | | |
|---|---|---|---|
| 967823 | 8/1964 | United Kingdom | 423/54 |
| 507074 | 9/1977 | U.S.S.R. | 423/54 |

*Primary Examiner*—Herbert T. Carter
*Attorney, Agent, or Firm*—Larson, Taylor and Hinds

[57] ABSTRACT

The invention relates to the production of tungsten having a low impurity content of molybdenum from impure minerals such as scheelite.

An aqueous acidic feed solution containing both molybdenum and tungsten, and also containing enough hydrogen peroxide to depolymerize heteropolymers of tungsten and molybdenum and prevent precipitation in the extractant, is contacted with an extractant composition comprising an organic phosphoric acid, a trialkyl phosphate and a tri-alkyl phosphine oxide in an hydrocarbon diluent. By selecting an appropriate combination of pH and hydrogen peroxide content of the feed, contents of the components of the extraction composition and temperature of extraction, selective extraction of molybdenum can be obtained. In some particularly preferred embodiments, the feed pH is in the range of 0.85 to 1.5, the mole ratio of hydrogen peroxide to tungsten and molybdenum is 0.6 to 1.0, the temperature of extraction is in the range 12° to 20° C. and the extractant composition comprises 8–15% di-2-ethylhexyl phosphoric acid from 8–15% tributyl phosphate, 2–3% tributyl phosphine oxide and at least 70% hydrocarbon diluent of low aromatics content.

The metal values can be stripped from the organic phase by a dilute aqueous alkali solution or an acidic aqueous hydrogen peroxide solution and can be recovered from the raffinate and stripping solution by precipitation.

19 Claims, 3 Drawing Figures

SEPARATION OF TUNGSTEN AND MOLYBDENUM BY SOLVENT EXTRACTION

The present invention relates to a process for the separation of tungsten and molybdenum.

Tungsten is a highly valued metal, especially suited for high temperature applications in view of its high melting point and high strength at high temperatures. Unfortunately, its properties are impaired if it contains a modest level of molybdenum so that for many electrical uses, the molybdenum level is, in practice reduced to only a few ppm. However, most sources of tungsten that have been located heretofore contain significant quantities of molybdenum in association with tungsten. In consequence, in order to obtain relatively pure tungsten, it is necessary to separate the molybdenum from the tungsten and this has proven to have been a difficult problem in view of the very complicated chemistry of tungsten and molybdenum, especially in aqueous acidic solutions. At equilibrium, there is a complex mixture of species including amongst others heteropolymeric species containing both tungsten and molybdenum. Separation of tungsten and molybdenum therefore poses significant problems.

The main process that has been described heretofore to carry out the separation takes advantage of the insolubility of molybdenum sulphide under aqueous acidic conditions. Thus, in a typical method of operation, the tungsten salt, for example scheelite or similar mineral salt, is dissolved in an aqueous sodium carbonate solution and then acidified by addition of a mineral acid such as hydrochloric, nitric or sulphuric acids. Sulphide is then introduced, generally as sodium sulphide and the tungsten solution is separated from the molybdenum sulphide precipitate. The process results in the evolution of poisonous sulphur compounds which can be released into the atmosphere or discharged in aqueous effluents and in consequence it is environmentally harmful. Particularly in industrial countries, there is a trend towards stricter controls upon environmental discharges, so that there is an increasing need to provide an alternative process for the separation of molybdenum from tungsten. Additionally, the process suffers from the disadvantage that a fair proportion of the tungsten is lost with the molybdenum sulphide precipitate in a form from which it is not easily recoverable.

One alternative method that has been proposed in U.S. Pat. No. 3,969,478 to Zelikman et al is based upon the preferential extraction of molybdenum into an organic phase contacted with an aqueous acidic solution of molybdenum and tungsten which contains additionally hydrogen peroxide in order to deprolymerise the heteropolymers of molybdenum and tungsten. The mole ratio of hydrogen peroxide to the total of molybdenum and tungsten was fixed by Zelikman at a minimum of 1.5:1 because use of a lower mole ratio resulted in a rapid destruction of the peroxide complex with tungsten, and hence a more rapid precipitation of tungstic acid and hampered extraction conditions. Although Zelikman disclosed that tributyl phosphate, as organic extractant, can selectively extract molybdenum, it suffers from various physical handicaps which preclude it from being employed under the conditions described by Zelikman et al in a practical system. First, tributyl phosphate has a very high viscosity, which at 25° C. is 3.39 centipoises, and secondly its density also at 25° C. is greater than 0.97. In combination, these two physical properties explain why tributyl phosphate suffers very poor phase disengagement from an aqueous phase with which it is contacted, such as would be employed not only in the extraction stage, but would also be employed in the stage of stripping the metal values from the organic phase. The problems included slow settling and also a propensity for emulsification. In consequence, and in order to achieve a workable extraction system employing tributyl phosphate, it is necessary to dilute it with an inert diluent, but when this is done, the capability of tributyl phosphate for extracting molybdenum from an aqueous solution under the same conditions is markedly impaired to such an extent that it ceases to be a viable proposition. Not only is the selectivity of molydenum over tungsten impaired, but also the extraction coefficient for molybdenum is covered. The effects arise, it is believed, as a result of interaction between the hydrocarbon diluent added to alter the density and viscosity of the system and tributyl phosphate.

It is an object of the present invention to provide a process for the selective removal of molybdenum from tungsten that ameliorates or overcomes the practical problems associated with the use of tributyl phosphate as organic extractant. It is a further object of some embodiments of the present invention to provide a process for the selective extraction of molybdenum from tungsten containing solutions employing less than 1.5 moles of hydrogen peroxide per mole in total of molybdenum and tungsten.

It is a still further object of at least some embodiments of the present invention to provide a process in which self buffering of the aqueous feed occurs during the liquid-liquid extraction process, thereby avoiding or at least substantially minimising the need for external control of the acidity of the solution.

Other and further objects of the present invention can be determined from the passages subsequent hereto.

According to the present invention, there is provided a process for the separation of molybdenum and tungsten comprising the steps of:

(i) contacting an aqueous acidic solution of molybdenum and tungsten with an organic extractant composition, said aqueous solution containing sufficient hydrogen peroxide to prevent a precipitate forming in the aqueous phase and having a pH selected in combination with the amount of hydrogen peroxide in solution, the temperature of the process and the composition of the extractant solution so as to prevent a precipitate forming in the organic extractant phase, and the organic extractant composition comprising;
 (a) from 5 to 20% of a substantially water-insoluble organic phosphoric acid,
 (b) sufficient trialkyl phosphate repeat in which each alkyl group contains from 4 to 12 carbon atoms, to ensure that component (a) remains in solution,
 (c) a tri alkyl phosphine oxide in an amount of at least 1 to 5% by weight based on the organic composition, and
 (d) the balance, preferably at least 70% based on the composition of a hydrocarbon diluent, (ii) maintaining the aqueous and organic phases in contact until at least some molybdenum has been extracted into the organic phase and thereafter (iii) separating the organic phase from the barren aqueous phase.

It will be recognized that the organic extraction compositions containing three components plus hydrocarbon diluent exhibit synergism in the selective extraction of molybdenum from aqueous acidic solutions containing tungsten and molybdenum in comparison with the separate components plus diluent.

Although component (a) can be any substantially water-insoluble organic phosphoric acid, i.e. a compound having a solubility at the contact temperature of less than 0.5 gpl, and preferably less than 0.15 gpl, the organic moiety or moieties preferably comprise alkyl substituents and especially branched alkyl substituents of sufficient chain length to impart the desired water-insolubility. It is highly desirable to employ either mono or di 2-ethyl-hexyl phosphoric acid, which are readily available commercially and have very high flash points. For the extraction of molybdenum from aqueous feeds having low concentrations of molybdenum and tungsten, it may often be desirable to employ extractant compositions containing the organic phosphoric acid at the upper end of its range, i.e. in the range 15-20%, but for extracting from more concentrated aqueous feeds and in order to reduce the possibility of precipitation occuring in the extractant phase, it is often desirable to employ the organic phosphoric acid in the range of from 5-15%, more preferably from 8-15%.

In the extractant compositions used in the present invention, component (b) of the composition is very preferably tributyl phosphate which can perform a plurality of functions. First, it acts as a synergist together with components (a) and (c) and secondly it acts as a modifier for (a), i.e. as a compound that enables component (a) to remain in solution in the extractant phase. Thus, in order to perform both functions, it is desirable that component (b) is present in a weight ratio of component (a) of at least 1:2, and to minimise antagonistic effects that can occur if an excessive proportion of component (b) is present, desirably no more than a weight ratio of 2:1 to component (a) is employed.

More preferably, the weight ratio of (a):(b) is in the range of 3:2 to 2:3. In practice, for many solutions, the proportion of component (b) in the composition is within the range of 5-15% by weight, and frequently in the range of 8-15% by weight.

The proportion of the trialkyl phosphine oxide, component (c) employed in the extractant composition depends upon inter alia which particular trialkyl phosphine oxide is being employed, and the temperature at which the extraction is carried out. Broadly speaking, where a higher temperature and a higher molecular weight phosphine oxide is being employed, a higher proportion of the phosphine oxide can desirably be incorporated, whereas where a lower molecular weight phosphine oxide and a lower extraction temperature is employed, the proportion of component (c) employed is preferably at the lower end of the range. Thus, for example, it is in practice desirable to employ a lower molecular weight compound such as tributyl phosphine oxide in the range of from 1% to 3% and especially in the range of from 2% to 3% since within that range there is achieved a balance between the benefit of enhanced selectivity of molybdenum extraction by the employment of such proportions of the phosphine oxide and the disadvantage of the loss of phosphine oxide into the aqueous phase by dissolution, which increases as the proportion of phosphine oxide in the composition increases. It will be understood that the solubility of alkyl phosphine oxides tends to diminish as the temperature of the solution is increased. The higher molecular weight phosphine oxides, and especially trioctyl phosphine oxine, by virtue of their lower solubility in and for water, can be preferably employed in the range of 2-5% of the composition.

The hydrocarbon diluents employed in the extractant compositions used in the present invention can be either aromatic or aliphatic and are liquid within the extraction range, usually having a boiling point within the range of 150°-275° C. In practice, commercially available hydrocarbon liquids are normally a mixture of components. Mixtures of commercially available diluents may be used, if desired. It is preferable to employ a diluent having less than 50% aromatics. Such diluents enable the extractant composition of the present invention to combine the advantage of a viscosity and density substantially lower than that of tributyl phosphate with the advantage of increasing the extraction coefficients and hence the loading in the extractant phase. Particularly suitable diluents comprise a mixture of aliphatics with naphthenes, often in a weight ratio of from 4:1 to 1:2 and an aromatics content of no more than 5% by weight. In many extractant compositions, the diluent constitutes from 75 to 80% by weight of the composition.

In order to prevent precipitation during the extraction, it is essential that sufficient hydrogen peroxide be present. In practice, employing the extractant composition described herein, this means the use of at least 0.6 moles of hydrogen peroxide per mole in total of tungsten and molybdenum in the aqueous acidic solution initially. However, there is a complex interaction between the hydrogen peroxide and the various molybdenum and tungsten species in the aqueous feed solution so that changes in the amount of hydrogen peroxide present result in changes in the extraction coefficients for both molybdenum and tungsten with result that there are changes in the selectivity of the extractant solution, i.e. the ratio of the extraction coefficient for molybdenum and the extraction coefficient for tungsten and for the ratio of tungsten to molybdenum remaining in the barren aqueous solution after extraction and in the extractant phase. As a general rule, it has been found that the extraction coefficient for molybdenum is more sensitive to changes in the ratio of hydrogen peroxide to molybdenum plus tungsten than is the extraction coefficient for tungsten.

In consequence, it is preferable to employ a mole ratio of not more than 1.5 moles of hydrogen peroxide per mole of tungsten and molybdenum in the feed. However, it will be recognised that the value for the extraction coeffiecient at any temperature is dependent also upon the other factors, including the pH of the feed, and indeed, though less desirably, a comparatively high hydrogen peroxide ratio in the range of from 1.5 to 2.25 can be employed if the feed pH is within the preferred range of from pH 0.8 to 1.75. It is highly preferable, even within the preferred pH range, to use below 1.5 mols and advantageously within the range of from 0.6 to 1.25 moles of hydrogen peroxide per mole W+Mo, the ratio especially being not more than 1.0:1. Most advantageously, it has been found that the benefit of employing the present extractant composition is greatest where the hydrogen peroxide ratio is in the range of 0.6 to 0.85.

The hydrogen peroxide can be employed in the form of commercially available hydrogen peroxide solutions, normally containing at least 30% by weight hydrogen peroxide and often from 35 to 70% by weight. Such solution normally contain small amounts of water soluble stabilizers. The hydrogen peroxide content of the aqueous feed can be monitored during the extraction process and where necessary to prevent precipitation, further amounts of hydrogen peroxide can be added, for example, to allow for losses on decomposition.

A very important variable in the extraction process is the pH of the feed solution. If the feed has a very low pH, generally speaking a pH of approximately 0.5 or lower, there is a very high tendency for precipitation to occur in the organic phase, thereby creating considerable difficulties by forming a third phase. On the other hand under mildly acid conditions the extraction of molybdenum, in particular, is very poor with result that the ratio of tungsten to molybdenum remaining in the barren aqueous phase after single stage extraction at e.g. 1:1 feed to extractant volume ratio is relatively little changed from its starting point and in practice, unexceptable. Although it is feasible to operate a system at mildy acid conditions e.g. in the range of pH 2.75 to pH 4, the number of extraction stages or alternatively the ratio of extractant to feed that would have to be employed to obtain efficient separation would be extremely high. In consequence, it is advantageous to employ an aqueous feed adjusted with a mineral acid to at least pH 0.65 and normally within the range of pH 0.75 to 2.75. In particular, it has been found that within the general pH range outlined hereinbefore, there is a pH range in which, in conjunction with the use of the extractant composition described herein, the pH of the aqueous feed remains substantially stable, i.e. the system is self-buffered. It will be recognised that self-buffering of a system is of considerable advantage in maintaining a process, particularly a continuous process under steady state and hence stable conditions for long periods of operation. Thus, where the feed has been acidified with sulphuric acid, which from the economic point of view is most desirable in view of the widespread availability and cheapness of the acid in comparison with other mineral acids, the self-buffering range is approximately from pH 1 to pH 2. Other mineral acids that can be used include hydrochloric and nitric acids.

It is naturally an aim of the user of a separation process to obtain a high ratio of tungsten to molybdenum in the barren aqueous solution and similarly it is a desideratum to obtain a low weight ratio of tungsten to molybdenum in the organic extractant. Consequently, and in order to achieve the high tungsten/molybdenum ratio in the barren solution, and especially at a low mole ratio of hydrogen peroxide to total tungsten and molybdenum initially in the feed solution, i.e. a mole ratio of below 1.5:1, an initial pH for the aqueous feed solution of from pH 0.85 to pH 2.0 is preferable, particularly within the range pH 0.85 to pH 1.5. In order to achieve the low tungsten/-molybdenum ratio in the extractant phase, and again especially at a low hydrogen peroxide mole ratio, there is again a preferred range of initial pH's for the feed, but the preferred range appears to be somewhat sensitive to the hydrogen peroxide mole ratio. The preferred range of pH is from pH 0.85 to pH 1.85 at the lowest useful hydrogen peroxide mole ratios, i.e. a mole ratio of from 0.6 to 0.7:1, and moves progressively to higher pH's as the hydrogen peroxide mole ratio is increased so that the preferred initial pH range at a hydrogen peroxide mole ratio of at 1:1 is from pH 1 to 2 and at 1.25:1 is from approximately pH 1.25 to 2.25.

It will be recognised from the foregoing that by employing a suitable combination of pH selection and hydrogen peroxide/Mo+W mole ratio, it is possible to obtain a process which is not only self-buffered, but which also provides at the same time a high tungsten to molybdenum ratio in the barren aqueous solution and a low ratio of tungsten to molybdenum in the extractant phase. Especially preferred processes employ an initial pH in the region of from pH 1.1 to 1.75 and a hydrogen peroxide mole ratio of from 0.6:1 to 1.0:1. Particularly convenient embodiments of the present invention employ a feed having an initial pH in the range of from 1.2 to 1.6 and the hydrogen peroxide mole ratio of from 0.7 to 0.85. For any process parameter the best ranges can be regarded as its core ranges. It will furthermore be recognised that if one of the two parameters is maintained within its core ranges, then the results obtained become worse the further the other parameter departs from its core range. Thus, the ratio in the barren aqueous phase becomes worse as the initial pH is increased to the range pH 3 to 4 and the tungsten/molybdenum ratio in the organic phase becomes worse as the hydrogen peroxide mole ratio is increased. Of course, increasing each of the parameters away from its core ranges leads more rapidly to less desirable separation.

A further factor of importance in the process is the temperature at which the aqueous feed is contacted with the organic extractant. There are various factors that influence the extraction in conflicting ways. First, as mentioned before, one of the components of the extraction system, the phosphine oxide, is more soluble in aqueous media at lower temperatures and thus extractant losses may become extremely high if low extraction temperatures are employed.

On the other hand, it has been found that the extraction coefficient for molybdenum is sensitive to temperature change, a higher temperature leading to a poorer extraction coefficient. This means that at a higher temperature, not only is the molybdenum extracted to a lesser extent than at lower temperatures, necessitating more extraction stages or a higher ratio of extractant to feed, in both cases demanding a higher initial capital outlay and an increased materials inventory but the disadvantage is compounded by the fact that the extraction coefficient for tungsten is less sensitive so that the separation coefficient of molybdenum and tungsten is also temperature sensitive. It is preferable to employ a temperature of at least 10° C. and desirably not higher than 30° C. Preferred operating conditions employ a temperature of at least 12° C. and a temperature of not more than 20° C. However, it will be recognised that there is no sharp cut off point and that therefore the decline in extraction efficiency as the temperature is increased is progressive. Thus, as with the effect of the hydrogen peroxide mole ratio and the initial pH of the feed, the further that the process is operated outside the core temperature range the worse will be the performance or the extraction loss.

Naturally, in comparison with operating a process in which none of the parameters is within its core range, it is preferable for any one of the parameters to be within its core range, more preferably for any two of the parameters to be within their core ranges and most preferable for all three of the parameters to be within their core ranges.

Hereinbefore, there have been described the various process conditions and composition of the extractant. It is highly desirable to employ the preferred compositions for the extractant in conjunction with the core ranges for the process parameters.

The process described herein can be carried out employing conventional equipment for liquid-liquid contact and separation. The process can be carried out either batch wise or on a semi continuous or continuous basis. In particularly suitable embodiments, a continuous counter-current process is employed. Such processes can be employed conveniently by virtue of the excellent separation characteristics of the extractant composition employed in the present invention.

Suitable items of apparatus include mixer-settlers and countercurrent columns, suitably being unfilled columns, sometimes otherwise referred to as spray columns, columns packed with an inert solid material or plate columns. It will be understood that the extraction process can be carried out in either one or a plurality of stages depending on the starting composition of the feed and the extent to which it is desired to increase the tungsten/molybdenum ratio. Where the process is carried out in a plurality of stages, the aqueous solution can be contacted with fresh extractant composition or with extractant which has been recycled and from which at least part of the metal values has been stripped. However, one convenient method when employing a plurality of stages is to pass the aqueous feed and a single extractant composition counter-sequentially, i.e. the fresh aqueous seed coming into contact with extractant composition that has already been in contact with molybdenum-depleted and thus partially barren aqueous feed and the fresh extractant composition first coming into contact with the most barren aqueous feed. The volume ratio of feed to organic extractant is normally in the range of 2:1 to 1:5 frequently about 1:1.

The aqueous raffinate, i.e. the aqueous phase separated after the, or the last, extraction stage can contain a small quantity of phosphine oxide which has been dissolved out of the extractant composition. In order to recover at least part of the phosphine oxide, the raffinate can be washed with either the diluent or with a mixture of the diluent with either or both of components (a) and (b) of the extractant composition. It is preferable for such washing to be effected at a temperature slightly higher than that at which the molybdenum extraction occured, and this can be effected most conveniently in some embodiments where the molybdenum extraction was carried out at a temperature of below ambient, by allowing the raffinate to reach ambient temperature in the presence of the organic washing phase. Alternatively, the organic phase may be heated and the temperature of the raffinate raised by its contact therewith.

The extractant composition loaded with metals in practice is passed to a stage for stripping at least part of the metal therefrom prior to returning the composition, possibly after make up to its original composition, where desired, to reextract molybdenum from further aqueous feed. Stripping can be effected under alkaline conditions by contacting the organic phase with an aqueous solution of an alkali preferably a mild and readily available alkali such as sodium carbonate or bicarbonate which can generate easily aqueous solutions in the range of pH 8 to pH 10, or aqueous sodium hydroxide in the same pH range. Alternatively other alkali metal or ammonium carbonates or hydroxides may be employed. Convenient solutions to employ contain from 0.5 to 5 moles per liter of alkali metal or ammonium carbonate. It will be recognised in the course of such stripping, any organic phosphoric acid in the extraction composition will be neutralised substantially completely and thus, prior to recycling the organic phase to extract molybdenum from more feed, it is necessary that the extraction composition be contacted with a mineral acid in an amount sufficient to restore the organic phosphoric acid to substantially the acidic form. A simple and convenient way of effecting this is to employ a solution of the same mineral acid as employed to acidify the tungsten solution, e.g. using sulphuric acid for both. Desirably, an excess of acid in the aqueous contact solution over the organic phosphoric acid to be restored is employed. A convenient mole ratio is from 1.5 to 2 moles of mineral acid in the aqueous phase per mole of organic phosphoric acid to be restored in the extractant phase.

An alternative method for stripping the metal values from the extractant phase and that employ acidic conditions employs an aqueous acidic solution of hydrogen peroxide, the conditions having been so selected that the extraction coefficients favour the reextraction of the metal values into the aqueous phase out of the organic phase.

It will be recognised that this can be achieved by selecting those conditions in which the extraction coefficient for the metal values is substantially the minimum in that the stripping coefficient is the inverse of the extraction coefficient. The amount of hydrogen peroxide to employ is preferably much higher than that employed in the feed solution, preferably being at least 2 moles per mole of molybdenum plus tungsten in the extractant composition, the mole ratio more desirably being at least 2.5:1. The stripping solution is preferably only mildly acid, for example having a pH of at least 3.0 initially, one convenient being pH 3 and 4. In combination with the high mole ratio of peroxide to metal values, such a pH in the stripping solution can achieve a very high stripping of metal values and enable the stripping from the extractant without the need to contact the extractant subsequently with an acid wash in order to restore the organic phosphoric acid to the acid form because when the hydrogen peroxide stripping process is used, it remains in the acid form. The stripping solution can be prepared by diluting commercially available hydrogen peroxide, e.g. having a concentration in the range of from 35 to 70% and acidifying employing a mineral acid, for example sulphuric acid. The stripping stage can be effected at the same temperature as the extractant stage, if desired, but from the point of view of stripping efficiency, it is preferable to employ a rather higher temperature than in the extractant stage. Thus, although the stripping stage can be effected at a temperature in the range of 10° to 40° C., it is preferable for stripping efficiency to employ a temperature at least 5° to 10° C. higher than the temperature employed in the extraction stage. This can be often effected by employing a temperature in the stripping stage of 25° to 40° C. The use of a higher temperature for the stripping stage also has the advantage that it minimises the content to which phosphine oxide is lost from the extractant in this stage.

The aqueous stripping solution contains a much higher ratio of molybdenum to tungsten than does the original feed solution produced by the dissolution of for example scheelite. Where it is decided to effect even greater separation of molybdenum from tungsten, the stripping solution as such, or a solution obtained by redissolution of the metal values recovered from the stripping solution, can be contacted with further extractant composition according to the present invention under the process conditions described hereinbefore and the resultant second extractant thereafter stripped. It will be recognised that the product of such a process contains only a very low tungsten impurity content.

The stripping coefficient for tungsten is much higher than for molybdenum in the aforementioned pH range of over 3 and conveniently from 3 to 4. Thus, if desired, stripping can be effected in two stages, the first stage employing a high organic to stripping solution volume ratio e.g. 3:1 to 5:1 or higher to produce a first stripping solution comparatively high in tungsten values and a second stripping operation employing a lower organic to stripping solution volume ratio, e.g. desirably approximately 1:1 to produce a second solution comparatively richer in molybdenum.

The stripping stage any washing can employ the same types of techniques and apparatus employed in the extraction stage. Thus, suitable items of apparatus include counter-current extractors and mixer-settlers and the ratio of the aqueous stripping solution to the extractant can be varied, taking into account the stripping coefficients and the extent to which residual values of metal in the extractant composition can be tolerated. A convenient ratio of stripping solution to extractant composition is often in the range by volume of 2:1:2, especially approximately 1:1, but it will be recognised that the higher the ratio, the better will be the stripping.

It will be recognised that the overall extraction and stripping process produces two aqueous solutions, the raffinate from the extraction stage having an enhanced tungsten to molybdenum ratio and the aqueous solution from the stripping stage having a tungsten to molybdenum ratio considerably lower than in the raffinate from the extraction stage. The metal values can be recovered from the aqueous solutions by the methods that have been disclosed heretofore for recovery of such metals from their aqueous acidic solutions. These include acidification of the raffinate to a pH of about pH 0-0.5 to precipitate tungstic acid, possibly after introduction of a reducing agent for hydrogen peroxide such as sodium sulphite or sulphur dioxide to promote decomposition of peroxy tungstate complexes. In an alternative method the raffinate is contacted with an organic amine such as trioctylamine or quaternary ammonium salts such as tiralkylbenzyl ammonium nitrate or tetraoctyl ammonium chloride in a diluent, which tends to extract the tungsten and residual molybdenum but leave in the aqueous phase silica and sodium. The organic phase is then stripped using aqueous solutions as described hereinbefore. Thus, for example where an aqueous carbonate solution has been used to strip, its pH can then be adjusted to about pH 0.7 to 1.0 in order to precipitate paratungstate which is then roasted to generate tungsten oxide.

A further method of stripping includes increasing the acidity of the raffinate to the range of approximately 0.7 to 1.0 and especially from 0.7 to 0.8 and employing a hydrogen peroxide to W+Mo mole ratio of 1.5 to 2.25 and particularly at least 1.6, and especially from 1.8 to 2.1 and contacting the raffinate with a further volume of the extractant composition according to the present invention, on account of the fact that at such pH conditions, the extraction coefficient $E_W$ is markedly higher than at the pH ranges preferred for separating molybdenum from tungsten. The separated extractant composition can then be stripped by an aqueous phase and tungsten recovered, both steps employing the techniques described hereinbefore.

Molybdenum values can be precipitated from peroxide-containing solutions by decomposition of the peroxy complex of molybdenum by addition to the solution of a reducing agent for hydrogen peroxide for example a sulphite.

The process of the present invention can be applied to feed solutions having a high initial weight ratio of tungsten to molybdenum, for example in the range of 20:1 to 50:1 and naturally can therefore also be used for more favourable conditions for molybdenum removal, i.e. feed solutions containing a lower initial tungsten/molybdenum ratio.

Having described the invention in general terms, specific embodiments of the invention will now be described more fully by way of example only. It will be understood that the skilled hydrometallurgist will be able to make modifications to the examples based upon the foregoing disclosure and using his general knowledge and experience without departing from the spirit of the invention, such modifications including the use of multi stage or countercurrent techniques and scaling the process up to plant scale.

For use in each of the Examples, a stock solution, which contained 40 gpl tungsten (calculated as the metal) and 2 gpl molybdenum (calculated as the metal) and maintained at approximately pH 5, was diluted with water and acidified sulphuric acid to nearly the desired pH. The desired mole ratio of hydrogen peroxide to the combined amounts of tungsten and molybdenum in solution was obtained by adding the appropriate amount of 70% by weight hydrogen peroxide and the solution then adjusted to the desired pH by addition of a small further amount of sulphuric acid. On each occasion in the Examples and comparisons 100 ml of feed solution having a concentration of tungsten and molybdenum of respectively 20 gpl and 1 gpl, calculated as before, was prepared, of which 25 ml was used in each extraction. A similar parallel feed solution was likewise prepared for use as an atomic absorption spectrophotometer standard in the analysis for molybdenum and tungsten. The extractant composition was obtaining by mixing the liquid components together in the desired proportions and dissolving in them the desired amount of the phosphine oxide.

The extraction was carried out by first bringing both feed solution and extractant composition to the desired extraction temperature by storage in a present constant temperature bath. The two phases were then mixed and shaken constantly in a mechanical shaker for 15 minutes so as to ensure that equilibrium between the phases had occurred. The mixture was then allowed to settle over a period of 5 minutes, although it was observed that when an extractant composition of the present invention was employed, settling appeared to be complete usually within 20 seconds. The aqueous and organic phases were separately pipetted out and analysed for molybdenum and tungsten contents from which was calculated the distribution coefficients for molybdenum and tungsten, respectively $E_{Mo}$ and $E_W$ the separation coefficient $E_S$, and also the ratio of tungsten/molybdenum in the depleted aqueous phase (raffinate) and the organic phase which in all the Examples, Tables and Figures is given in the form of the weight ratio. The organic phase was stripped at ambient temperature by shaking for 15 minutes in a 1:1 volume ratio with either a 2 M sodium carbonate or a 1 M ammonium carbonate solution. It was observed that no emulsions occurred on stripping and that during settling, phase separation occurred within 30 seconds.

In the Examples, the organic phosphoric acid used was di-2-ethylhexyl phosphoric acid which contained a small proportion of lower molecular weight acid, believed to be about 5% w/w of mono-2-ethylhexyl phosphoric acid and the mixture herein is referred to as EHPA. In the Examples, herein as TBP, and the phosphine oxide was tributyl phosphine oxide referred to herein as TBPO. The diluent used in the extractant composition was a mixture of hydrocarbons having a density at 20° C. of 0.808, a viscosity of 25° C. of 1.93 centipoises and a boiling point of 193° C. It appeared to be insoluble in water, and composed of 40% w/w aliphatics and 58% w/w naphthenes, the aromatics content being less than 2% w/w.

EXAMPLES 1 TO 38

In Examples 1 to 38, the extractant composition was 10% EHTA, 10% TBP, 2% TBPO and balance (78%) diluent, %'s being by weight, and the feed solution was contacted with the extractant composition at 15° C. The other process conditions—initial pH, equilibrium pH and hydrogen peroxide to total molybdenum and tungsten mole ratio (abbreviated to Perox/Mo+W ratio in the Table heading), and the results obtained are specified in Table 1.

TABLE I

| Ex No | Init pH | Equil pH | Perox/ Mo + W Ratio | $E_{Mo}$ | $E_W$ | $E_S$ | W/Mo Ratio Raff. | W/Mo Ratio Org. |
|---|---|---|---|---|---|---|---|---|
| 1 | 3.40 | 3.02 | 1.41 | 0.37 | 0.063 | 5.9 | 22.9 | 3.9 |
| 2 | 2.85 | 2.51 | 1.29 | 0.51 | 0.068 | 7.5 | 26.5 | 3.5 |
| 3 | 3.38 | 2.75 | 1.13 | 0.38 | 0.055 | 6.9 | 23.8 | 3.4 |
| 4 | 2.94 | 2.50 | 1.00 | 0.41 | 0.063 | 6.6 | 24.7 | 3.8 |
| 5 | 2.48 | 2.05 | 1.15 | 0.77 | 0.077 | 10.0 | 33.2 | 3.1 |
| 6 | 2.32 | 2.06 | 0.88 | 0.70 | 0.054 | 12.7 | 31.5 | 2.5 |
| 7 | 1.95 | 1.92 | 1.04 | 0.77 | 0.058 | 13.2 | 33.4 | 2.5 |
| 8 | 1.93 | 1.93 | 0.76 | 1.02 | 0.070 | 14.6 | 36.3 | 2.5 |
| 9 | 1.44 | 1.58 | 0.91 | 1.06 | 0.076 | 13.9 | 37.4 | 2.7 |
| 10 | 1.47 | 1.41 | 0.64 | 1.28 | 0.065 | 19.9 | 41.0 | 2.1 |
| 11 | 3.42 | 2.90 | 0.85 | 0.34 | 0.050 | 6.8 | 23.0 | 3.4 |
| 12 | 2.92 | 2.51 | 0.73 | 0.68 | 0.057 | 12.0 | 30.4 | 2.5 |
| 13 | 2.45 | 1.98 | 0.61 | 1.12 | 0.071 | 15.8 | 39.0 | 2.5 |
| 14 | 2.09 | 2.11 | 1.56 | 0.69 | 0.076 | 9.1 | 32.2 | 3.5 |
| 15 | 1.56 | 1.49 | 1.45 | 1.05 | 0.090 | 11.7 | 37.3 | 3.2 |
| 16 | 2.03 | 2.03 | 1.30 | 0.74 | 0.067 | 11.0 | 31.2 | 2.8 |
| 17 | 1.51 | 1.56 | 1.19 | 1.04 | 0.079 | 13.1 | 36.7 | 2.8 |
| 18 | 1.03 | 1.13 | 1.33 | 1.23 | 0.137 | 9.0 | 38.3 | 4.3 |
| 19 | 1.00 | 0.94 | 1.06 | 1.25 | 0.102 | 12.3 | 40.2 | 3.3 |
| 20 | 0.67 | 0.79 | 1.23 | 1.30 | 0.144 | 9.0 | 38.5 | 4.3 |
| 21 | 0.98 | 1.03 | 0.80 | 1.44 | 1.102 | 14.1 | 43.6 | 3.1 |
| 22 | 1.05 | 1.03 | 1.55 | 1.20 | 0.126 | 9.5 | 38.4 | 4.0 |
| 23 | 0.74 | 0.78 | 1.76 | 1.16 | 0.235 | 4.9 | 34.3 | 7.0 |
| 24 | 1.16 | 1.08 | 1.76 | 1.19 | 0.123 | 9.7 | 39.1 | 4.0 |
| 25 | 1.01 | 1.00 | 2.00 | 1.13 | 0.159 | 7.1 | 36.2 | 5.1 |
| 26 | 1.50 | 1.65 | 2.00 | 1.09 | 0.128 | 8.6 | 37.5 | 4.4 |
| 27 | 1.75 | 1.72 | 1.78 | 0.93 | 0.100 | 9.3 | 34.2 | 3.7 |
| 28 | 1.97 | 2.08 | 2.01 | 0.67 | 0.087 | 7.7 | 31.7 | 4.1 |
| 29 | 2.29 | 2.34 | 1.79 | 0.56 | 0.076 | 7.4 | 28.2 | 3.8 |
| 30 | 2.52 | 2.49 | 2.03 | 0.55 | 0.074 | 7.4 | 28.8 | 3.9 |
| 31 | 2.25 | 2.29 | 2.25 | 0.67 | 0.077 | 8.8 | 30.9 | 3.5 |
| 32 | 1.72 | 1.73 | 2.24 | 1.02 | 0.112 | 9.1 | 36.4 | 4.0 |
| 33 | 2.72 | 2.67 | 2.26 | 0.47 | 0.078 | 6.1 | 26.6 | 4.4 |
| 34 | 0.07 | 0.14 | 2.71 | 1.15 | 0.380 | 3.0 | 29.4 | 9.7 |
| 35 | 0.30 | 0.35 | 2.50 | 1.26 | 0.493 | 2.5 | 26.6 | 10.4 |
| 36 | 0.08 | 0.16 | 2.50 | 1.08 | 0.404 | 2.7 | 28.0 | 10.5 |
| 37 | 0.13 | 0.23 | 2.25 | 1.10 | 0.367 | 3.0 | 32.0 | 10.6 |
| 38 | 0.02 | 0.07 | 2.00 | 1.30 | 0.580 | 2.2 | 30.0 | 13.4 |

From Table 1, it can be seen that both the initial pH of the feed and the mole ratio of hydrogen peroxide to tungsten and molybdenum significantly affect the results obtained and that it is particularly desirable to employ a low peroxide/Mo+W mole ratio to obtain better separation. Table 1, in particular, demonstrates the range of initial pH of the feed which is self-buffering or substantially so, and the pH ranges in which it is comparatively desirable not to extract, but which instead can be employed in a subsequent stripping stage.

COMPARISONS C39 TO C41 AND EXAMPLE 42.

This Example and these comparisons were carried at 15° C. by the method described herein as employed for Examples 1–38. The aqueous feed was adjusted to an initial pH of 1.32 and the mole ratio of hydrogen peroxide to total tungsten/molybdenum was 0.75:1. As before a 1:1 feed to extractant ratio was used. The compositions of the extractants, and the results obtained as summarised in Table II.

TABLE II

| Ex/ Comp No. | % Extractant Composition TBP | EHPA | TBPO | diluent | W% Ext. | Mo% Ext. | $E_S$ |
|---|---|---|---|---|---|---|---|
| C39 | 10 | — | — | balance | 1.32 | 2.06 | 1.57 |
| C40 | — | 10 | — | balance | 2.33 | 13.99 | 6.81 |
| C41 | — | 10 | 2 | balance | 5.01 | 34.10 | 9.82 |
| C42 | 10 | 10 | 2 | balance | 7.15 | 55.25 | 16.03 |

It can be concluded from Table II that the three-extractant (TBP+EHPA+TBPO) synergistic system is a much better choice than any of the comparison extraction systems mentioned above.

COMPARISON C43 AND EXAMPLE 44

This comparison and this Example were carried out using the method described herein for the preceding Examples employing a temperature of 25° C., and a feed solution having an initial pH of 1.4 and a peroxide:-molybdenum+tungsten mole ratio of 1:1. The extractant compositions and results are summarised in Table III.

TABLE III

| Ex/ Comp No. | %'s in Extractant Composition TBP | EHPA | TBPO | diluent | W% Ext. | Mo% Ext. | $E_S$ |
|---|---|---|---|---|---|---|---|
| C43 | 10 | 10 | — | balance | 1.32 | 4.25 | 3.3 |
| 44 | 10 | 10 | 2 | balance | 4.57 | 40.74 | 14.4 |

Table III demonstrates clearly the value of employing the invention extraction composition instead of the comparison composition.

EXAMPLES 45–49 AND COMPARISONS C50–C53.

These Examples and Comparisons were carried out by the general method described herein for the preceding Examples, but employed the temperature, initial feed pH and hydrogen peroxide to molybdenum+tungsten mole ratio as specified in Table IV. In each case, the extractant composition used was as in Examples 1–38. The results also are summarised in Table IV.

TABLE IV

| Ex/Comp No | Init. pH | Temp °C. | Perox/ Mo + W Ratio | $E_{Mo}$ | $E_W$ | $E_S$ |
|---|---|---|---|---|---|---|
| 45 | 1.70 | 15.0 | 0.75 | 1.05 | 0.062 | 16.9 |
| 46 | 1.70 | 30.0 | 0.75 | 0.49 | 0.048 | 10.2 |
| 47 | 1.70 | 30.0 | 1.00 | 0.48 | 0.059 | 8.1 |
| 48 | 1.70 | 15.0 | 1.00 | 0.91 | 0.065 | 14.0 |
| 49 | 1.2 | 22.5 | 0.88 | 0.84 | 0.076 | 11.1 |

TABLE IV-continued

| Ex/Comp No | Init. pH | Temp °C. | Perox/ Mo + W Ratio | $E_{Mo}$ | $E_W$ | $E_S$ |
|---|---|---|---|---|---|---|
| C50 | 0.70 | 30.0 | 1.00 | | Precipitation | |
| C51 | 0.70 | 15.0 | 1.00 | | Precipitation | |
| C52 | 0.70 | 30.0 | 0.75 | | Precipitation | |
| C53 | 0.70 | 15.0 | 0.75 | | Precipitation | |

From Table IV, it can be seen not only that it is preferable to employ an extraction temperature of 15° C. rather than 22.5° C. or 30° C. but also that if the feed is acidified excessively, and a lower peroxide:Mo+W mole ratio is used then precipitation in the extractant occurs.

EXAMPLES 54–61

These Examples were carried out using the general method described herein, employing the conditions and extractant compositions as summarised in Table V, which also shows the results which are each an average of two mins. In each Example the hydrogen peroxide to tungsten+molybdenum mole ratio used was 0.75:1, and the diluent comprised the balance of the extractant composition.

TABLE V

| | %s in Extractant Compositions | | |
|---|---|---|---|
| Ex No | EHPA % by weight | TBP % by weight | TBPO % by weight |
| 54 | 9.0 | 9.0 | 1.8 |
| 55 | 11.0 | 9.0 | 1.8 |
| 56 | 9.0 | 11.0 | 1.8 |
| 57 | 11.0 | 11.0 | 1.8 |
| 58 | 9.0 | 9.0 | 2.2 |
| 59 | 11.0 | 9.0 | 2.2 |
| 60 | 11.0 | 11.0 | 2.2 |
| 61 | 11.0 | 11.0 | 2.2 |

| Ex No | Init pH | Equil pH | $E_{Mo}$ | $E_W$ | $E_S$ |
|---|---|---|---|---|---|
| 54 | 1.30 | 1.30 | 1.15 | 0.095 | 12.1 |
| 55 | 1.32 | 1.33 | 1.01 | 0.080 | 12.6 |
| 56 | 1.32 | 1.31 | 1.15 | 0.102 | 11.3 |
| 57 | 1.32 | 1.32 | 1.18 | 1.103 | 11.5 |
| 58 | 1.33 | 1.34 | 1.27 | 0.094 | 13.5 |
| 59 | 1.32 | 1.33 | 1.39 | 0.085 | 16.4 |
| 60 | 1.33 | 1.33 | 1.42 | 0.113 | 12.6 |
| 61 | 1.29 | 1.30 | 1.38 | 0.112 | 12.3 |

From Table V, it can be seen that to achieve a higher $E_S$ (separation coefficient) it is desirable to include a higher proportion of TBPO, but it will also be recalled that naturally some increase in extractant loss would thereby occur at the same time. Secondly a higher ratio of EHPA to TBP tends to improve $E_S$ also.

Figure 2:
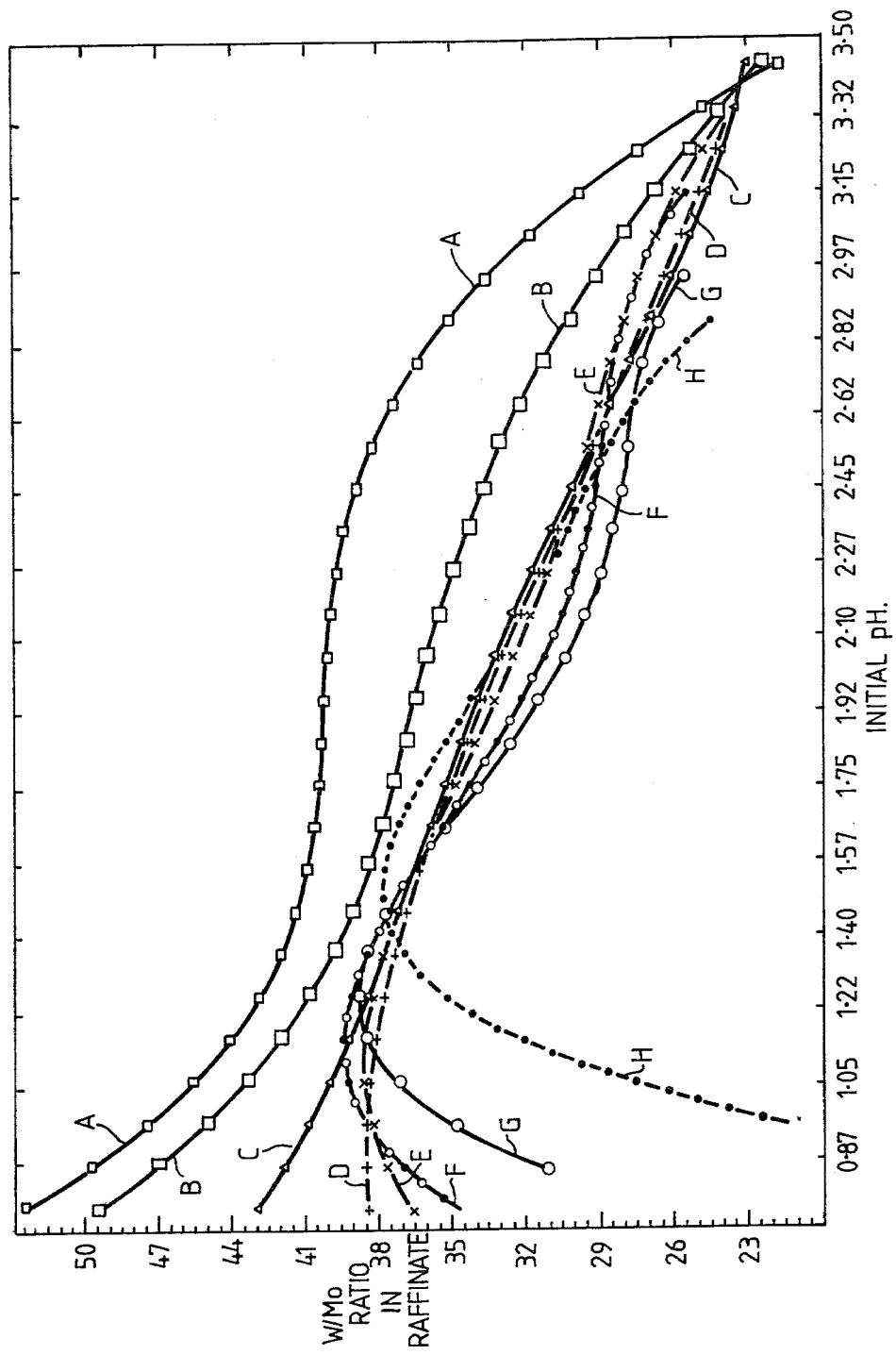
Figure 3:
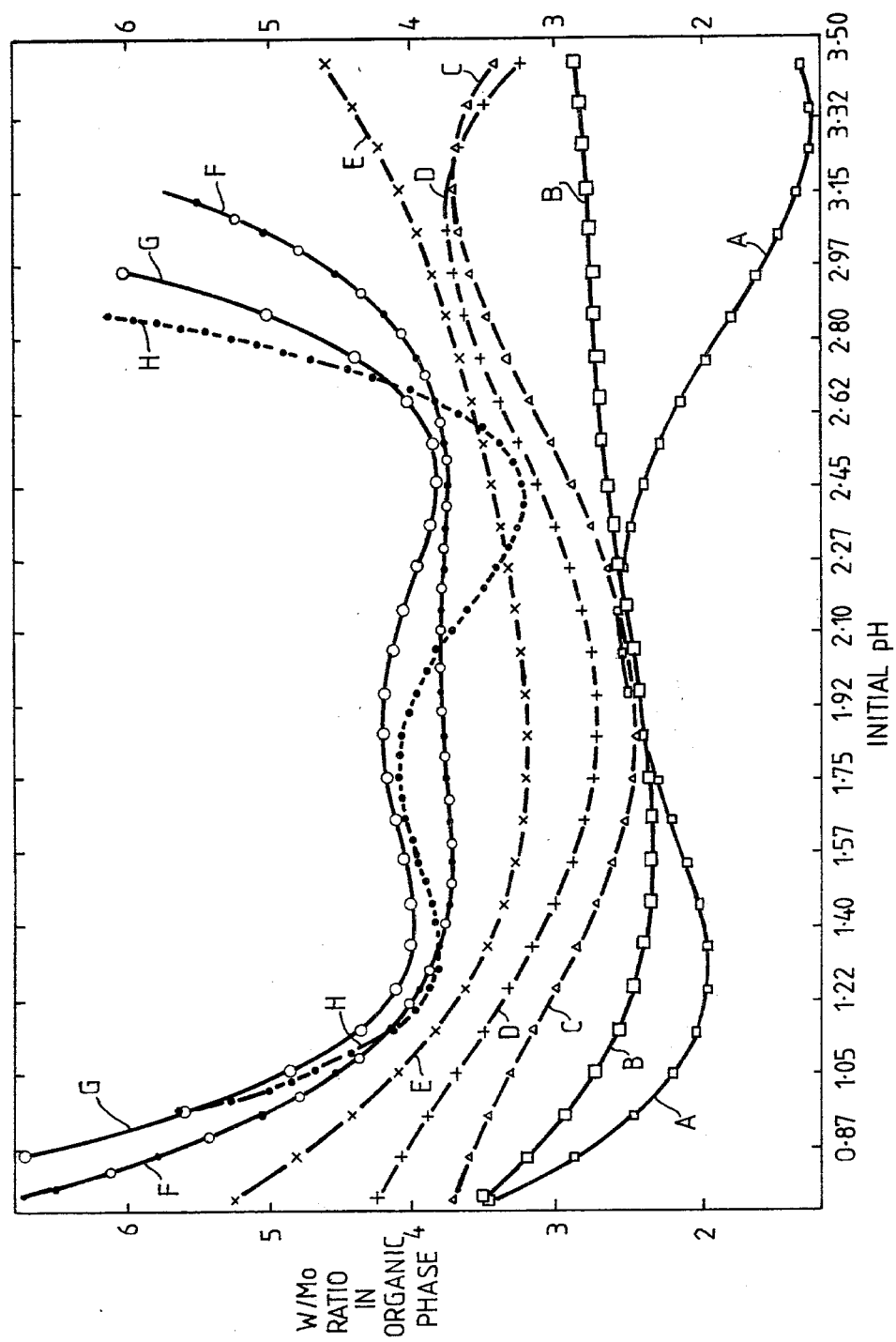

Graphs of $E_S$ (Separation coefficient) and the W/Mo weight ratio in respectively the raffinate and the extractant phase at equilibrium against the initial pH of the feed, each at several mole ratios of hydrogen peroxide to total Mo+W at 15° C. have been determined from the results obtained, employing regression analytical techniques and are shown here in respectively FIGS. 1 to 3.

In the Figures the graphs are plotted as follows:

| Key | Mole Ratio of $H_2O_2:W + M_o$ | Representation |
|---|---|---|
| A | 0.61 | —□——□——□— |
| B | 0.75 | –□––□––□– |
| C | 1.00 | —△——△——△— |
| D | 1.25 | —+——+——+— |
| E | 1.50 | —x——x——x— |
| F | 1.75 | —o—•—o—•—o— |
| G | 2.00 | —O——O——O— |
| H | 2.25 | —•—•—•—•—•— |

We claim:
1. A process for the separation of molybdenum and tungsten comprising the steps of:
   (i) contacting an aqueous acidic solution of molybdenum and tungsten with an organic extractant composition, said aqueous solution containing sufficient hydrogen peroxide to prevent a precipitate forming in the aqueous phase and having a pH selected in combination with the amount of hydrogen peroxide in solution, the temperature of the process and the composition of the extractant solution so as to prevent a precipitate forming in the organic extractant phase, and said organic extractant composition comprising;
       (a) from 5 to 20% of a substantially water-insoluble organic phosphoric acid,
       (b) sufficient trialkyl phosphate in which each alkyl group contains from 4 to 12 carbon atoms, to ensure that component (a) remains in solution,
       (c) a tri alkyl phosphine oxide in an amount of at least 1 to 5% by weight based on the organic composition, and
       (d) the balance being a hydrocarbon diluent,
   (ii) maintaining the aqueous and organic phases in contact until at least some molybdenum has been extracted into the organic phase and thereafter
   (iii) separating the organic phase from the barren aqueous phase.
2. A process according to claim 1 wherein the hydrocarbon diluent constitutes at least 70% of the extractant composition.
3. A process according to claim 2 wherein the composition comprises 8–15% of component (a), 8–15% of component (b), 2–3% of component (c) and 70–80% of component (d), %'s being by weight.
4. A process according to claim 1 wherein the organic phosphoric acid is di-2-ethyl hexyl phosphoric acid.
5. A process according to claim 1, 2, 3 or 4 wherein the alkyl phosphate is tributyl phosphate.
6. A process according to claim 1, 2, 3 or 4 wherein the alkyl phosphine oxide is tributyl phosphine oxide or trioctyl phosphine oxide.
7. A process according to claim 1, 2, 3 or 4 wherein the weight ratio of component (a) to component (b) is within the range 3:2 to 2:3.
8. A process according to claim 1, 2, 3 or 4 wherein the diluent has an aromatics content of no more than 5% by weight, based on the diluent.
9. A process according to claim 1 or 3 wherein the organic phosphoric acid is di-2-ethyl hexyl phosphoric acid, the alkyl phosphate is tributyl phosphate, the weight ratio of component (a) to component (b) is within the range 3:2 to 2:3, the alkyl phosphine oxide is tributyl phosphine oxide or trioctyl phosphine oxide, and the diluent has an aromatics content of no more than 5% by weight, based on the diluent.
10. A process according to claim 1 or 3 wherein the extractant composition is subjected to a cycle compris- ing, sequentially, contact with the feed to extract metal values into the extractant, contact with an aqueous stripping solution to remove metal values, and where necessary contact with a regenerant and/or make-up to restore the extractant composition to a desired composition.

11. A process according to claim 1 or 3 wherein the feed has an initial pH selected or adjusted to within the range of pH 0.65 to 2.75, and contains hydrogen peroxide in a mole ratio to total tungsten and molybdenum in the feed of at least 0.6 and the extraction is carried out at a temperature of at least 10° C.

12. A process according to claim 11 wherein the mole ratio of hydrogen peroxide to total tungsten and molybdenum in the feed is from 0.6 to 1.5.

13. A process according to claim 11 wherein the mole ratio of hydrogen peroxide to total tungsten and molybdenum in the feed is from 0.6 to 0.85.

14. A process according to claim 11 wherein the feed has an initial pH in the range 0.75 to 2.0.

15. A process according to claim 14 wherein the feed has an initial pH in the range pH 1.2 to 1.6.

16. A process according to claim 11 wherein the extraction is carried out at a temperature of from 12° to 20° C.

17. A process according to claim 11 wherein the mole ratio of hydrogen peroxide to total tungsten and molybdenum in the feed is from 0.6 to 1.0 and the feed has an initial pH in the range of from 1.1 to 1.75.

18. A process according to claim 17 wherein the mole ratio of hydrogen peroxide to total tungsten and molybdenum in the feed is from 0.6 to 0.85 and the feed has an initial pH in the range of from 1.2 to 1.6.

19. A process according to claim 1 wherein molybdenum-barren raffinate is washed subsequently with diluent alone or together with either or both of components (a) and (b) of the extractant composition, in order to recover phosphine oxide from the raffinate.

* * * * *